United States Patent
Yoshii et al.

(10) Patent No.: US 8,456,102 B2
(45) Date of Patent: Jun. 4, 2013

(54) ILLUMINATION CONTROL APPARATUS

(75) Inventors: Katsuji Yoshii, Tokyo-to (JP); Yoshiaki Gouda, Moriguchi (JP); Masaaki Meguro, Moriguchi (JP); Junya Nakasone, Moriguchi (JP)

(73) Assignee: Sanyo Electric Co., Ltd., Osaka (JP)

(*) Notice: Subject to any disclaimer, the term of this patent is extended or adjusted under 35 U.S.C. 154(b) by 217 days.

(21) Appl. No.: 13/035,499

(22) Filed: Feb. 25, 2011

(65) Prior Publication Data

US 2011/0210672 A1 Sep. 1, 2011

(30) Foreign Application Priority Data

Feb. 26, 2010 (JP) ................................ 2010-043076

(51) Int. Cl.
*H05B 37/02* (2006.01)
(52) U.S. Cl.
USPC ............................ 315/291; 315/158; 315/312
(58) Field of Classification Search
USPC ............. 315/149–159, 291, 312; 340/310.01, 340/541
See application file for complete search history.

(56) References Cited

U.S. PATENT DOCUMENTS

| | | | | |
|---|---|---|---|---|
| 6,967,565 B2* | 11/2005 | Lingemann | ............... | 340/12.23 |
| 7,948,189 B2* | 5/2011 | Ahmed | .................. | 315/291 |
| 2004/0036603 A1* | 2/2004 | Bingham | ................ | 340/541 |
| 2010/0150409 A1* | 6/2010 | Ferguson | ................ | 382/118 |

FOREIGN PATENT DOCUMENTS

| | | |
|---|---|---|
| EP | 1408276 A2 | 4/2004 |
| EP | 1707870 A1 | 10/2006 |
| JP | 2002-313588 A | 10/2002 |
| WO | 2009/023965 A1 | 2/2009 |

OTHER PUBLICATIONS

Extended European Search Report for Application No. 11156075.1 dated Jul. 25, 2011 (5 pages).

* cited by examiner

*Primary Examiner* — Tung X Le
(74) *Attorney, Agent, or Firm* — Osha Liang LLP

(57) ABSTRACT

An illumination control apparatus configured to control brightness of a plurality of illumination devices that is provided in a plurality of sections, respectively, includes: a detection unit configured to detect presence or absence of a person in each of the plurality of sections based on an output of a video camera configured to take images of the plurality of sections; and a control unit configured to turn on an illumination device of a detected section among the plurality of illumination devices, the detected section being a section where a person is detected, turn off an illumination device of a section other than the detected section and an adjacent section among the plurality of illumination devices, the adjacent section being a section adjacent to the detected section, and control brightness of the illumination device of the adjacent section so that illuminance of the detected section becomes predetermined illuminance.

5 Claims, 9 Drawing Sheets

ILLUMINATION CONTROL APPARATUS

CROSS-REFERENCE TO RELATED APPLICATION

This application claims the benefit of priority to Japanese Patent Application No. 2010-043076, filed Feb. 26, 2010, of which full contents are incorporated herein by reference.

BACKGROUND OF THE INVENTION

1. Field of the Invention

The present invention relates to an illumination control apparatus.

2. Description of the Related Art

In an office and the like in an office building, turning on and off of illumination devices, which are provided in sections, respectively, might be controlled on the basis of detection results of human detection sensors, which are provided in a plurality of sections, respectively (See Japanese Patent Laid-Open Publication No. 2002-313588, for example).

Each of the illumination devices is provided at a position where the center of a section becomes the brightest in general. Therefore, in a case where only an illumination device in a detected section, where a person is detected, is turned on, although the center of the detected section can ensure desired illuminance, it is difficult to ensure the desired illuminance at a position far from the center of the detected section. Thus, in order to obtain the desired illuminance in the entire detected section, the illumination device in a section adjacent to the detected section also needs to be turned on, for example.

However, in such a case, the illuminance of the detected section might greatly exceed the desired illuminance, resulting in wasteful power consumption.

The present invention was made in view of the above problem and an object thereof is to provide an illumination control apparatus capable of reducing power consumption while the desired illuminance is ensured.

SUMMARY OF THE INVENTION

An illumination control apparatus according to an aspect of the present invention, which controls brightness of a plurality of illumination devices that is provided in a plurality of sections, respectively, includes: a detection unit configured to detect presence or absence of a person in each of the plurality of sections based on an output of a video camera configured to take images of the plurality of sections; and a control unit configured to turn on an illumination device of a detected section among the plurality of illumination devices, the detected section being a section where a person is detected, turn off an illumination device of a section other than the detected section and an adjacent section among the plurality of illumination devices, the adjacent section being a section adjacent to the detected section, and control brightness of the illumination device of the adjacent section so that illuminance of the detected section becomes predetermined illuminance.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 5 is a diagram illustrating a functional block implemented by a CPU 61a;

FIG. 6 is a flowchart illustrating an example of processing to be executed by a computer 21a;

DETAILED DESCRIPTION OF THE INVENTION

At least the following details will become apparent from descriptions of this specification and of the accompanying drawings.

==First Embodiment of Device Control System 10==

Figure 1:
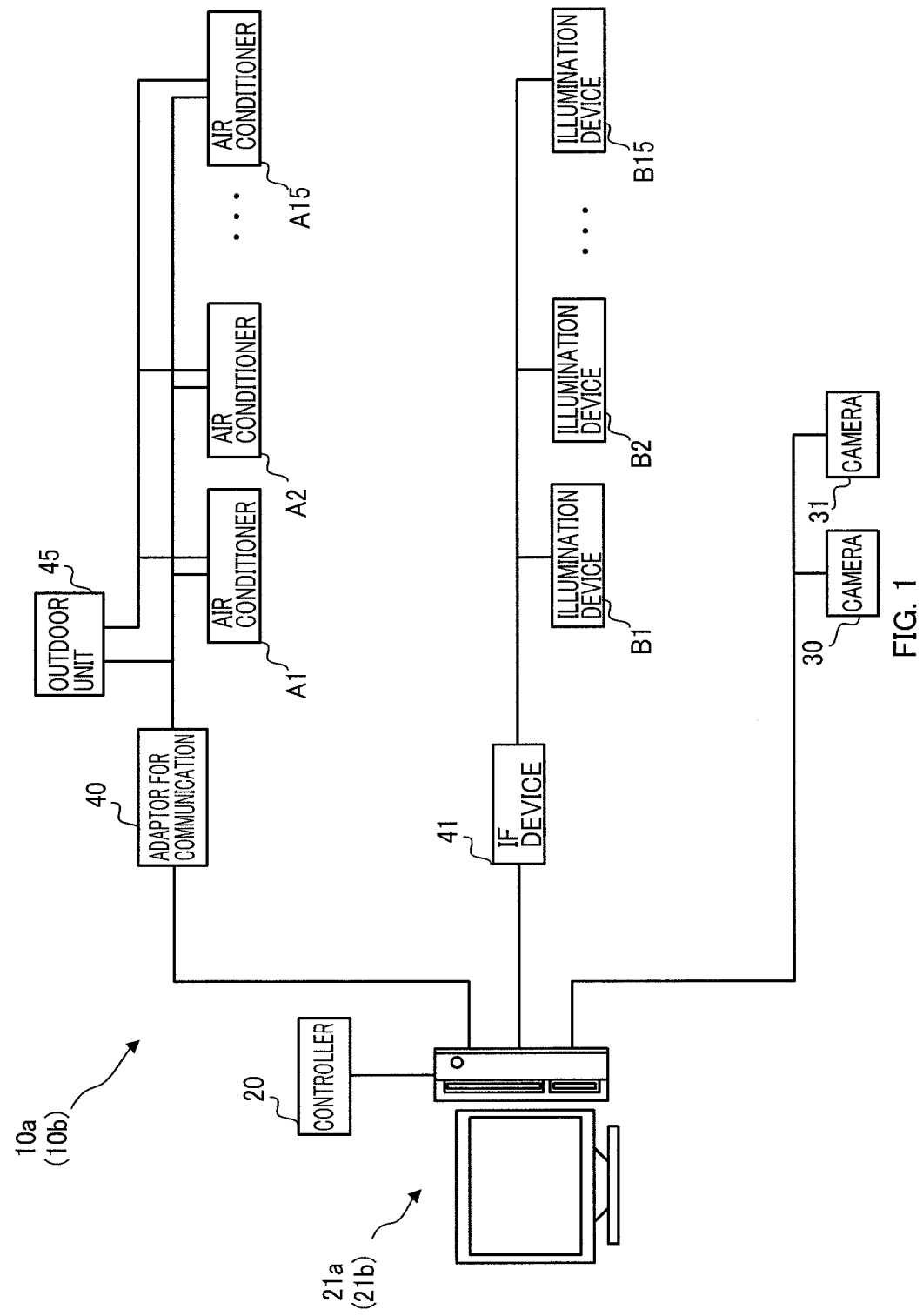
FIG. 1 is a diagram illustrating a configuration of a device control system 10 according to an embodiment of the present invention.
Figure 2:
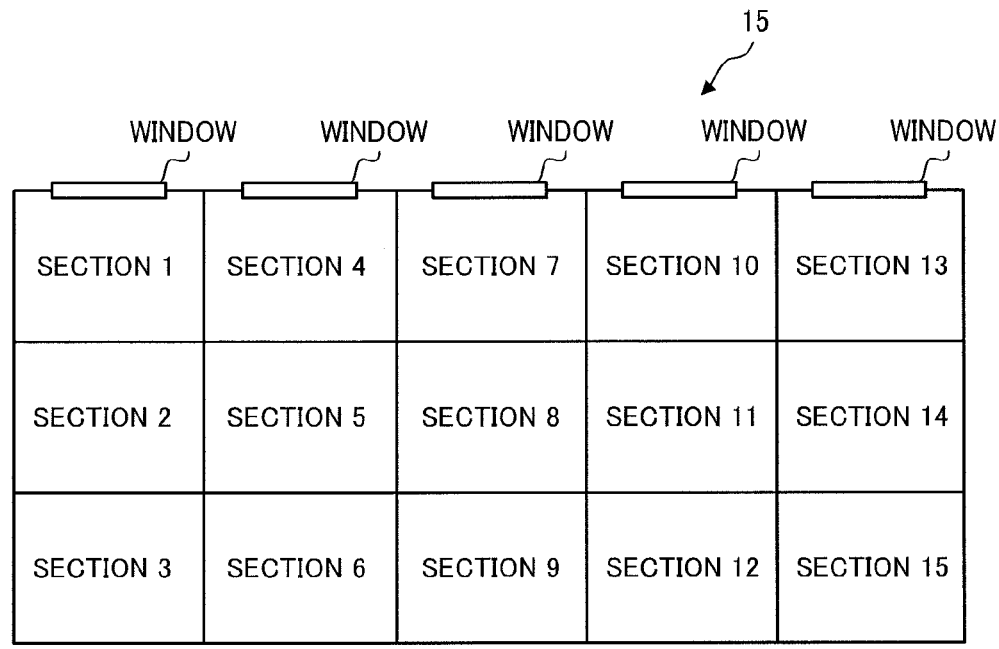
FIG. 2 is a plan view illustrating sections of an office 15.
Figure 3:
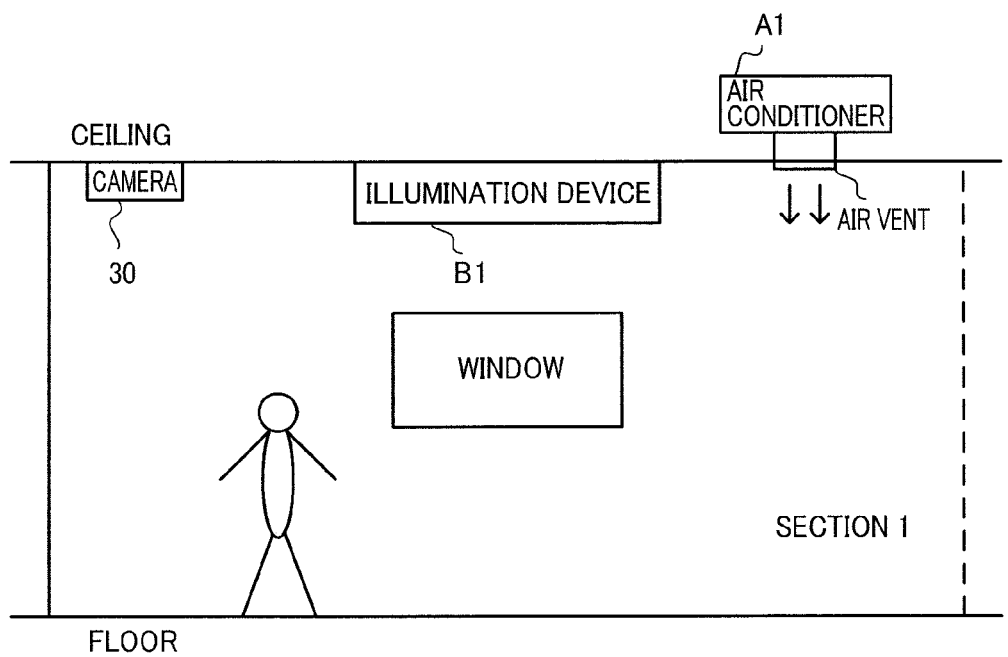
FIG. 3 is a side view of a section 1 in an office 15.

FIG. 1 is a first embodiment of the present invention and a diagram illustrating a configuration of a device control system 10a configured to control various devices provided in an office 15 in an office building, for example. FIG. 2 is a plan view illustrating sections of a space in the office 15. The office 15 is divided into 15 virtual sections of sections 1 to 15, for example. Also, the sections 1, 4, 7, 10, and 13 in the office 15 are provided with windows through which outside light can be taken in are provided. FIG. 3 is a side view of the section 1 in the office 15.

The device control system 10a includes a controller 20, a computer 21a, cameras 30 and 31, a communication adaptor 40, an interface (IF) device 41, an outdoor unit 45, air conditioners A1 to A15, and illumination devices B1 and B15.

The controller 20 is a so-called operation panel for a user to set states of the air conditioners A1 to A15 and the illumination devices B1 to B15. Specifically, the controller 20 is operated, to set turning on/off, selection between cooling and heating, temperature and the like of the air conditioners A1 to A15, and turning on/off, brightness and the like of the illumination devices B1 to B15. An operation result of the controller 20 is transmitted to the computer 21a.

The computer 21a (illumination control apparatus) is a device configured to integrally control the device control system 10a. Specifically, the computer 21a controls the air conditioners A1 to A15 and the illumination devices B1 to B15 on the basis of the operation result of the controller 20 and images taken by the cameras 30 and 31, which will be described later. The computer 21a will be described later in detail.

The camera 30 is provided on a ceiling of the section 1 and takes images of the space inside the office 15. The camera 31 is provided on a ceiling of the section 15 (not shown), for example, and takes images of the space inside the office 15. It is assumed that the images of all the regions in the office 15 are taken by the cameras 30 and 31. Though details will be described later, the images from the cameras 30 and 31 are processed by the computer 21a, so that a detected section where a person is detected is specified among the sections 1 to 15.

The communication adaptor 40 connects the computer 21a to the air conditioners A1 to A15 and the outdoor unit 45 so that the computer 21a can control the air conditioners A1 to A15 and the outdoor unit 45.

The interface device (IF device) 41 connects the computer 21a to the illumination devices B1 to B15 so that the computer 21a can control the illumination devices B1 to B15.

The outdoor unit 45 is connected to the air conditioners A1 to A15 and operates with the air conditioners A1 to A15 when the air conditioners A1 to A15 supply conditioned air.

The air conditioner A1 is provided on the ceiling of the section 1 as shown in FIG. 3, and supplies conditioned air to the section 1 through an air vent in accordance with the control of the computer 21a. In the air conditioner A1, a temperature sensor (not shown) is provided. Also, the air conditioner A1 supplies conditioned air so that the temperature of the above temperature sensor, that is, the temperature of the section 1 becomes equal to a desired temperature.

The air conditioners A2 to A15 are provided on ceilings of the sections 2 to 15, respectively, and supply conditioned air to the sections 2 to 15, similarly to the air conditioner A1.

The illumination device B1 is a fluorescent lamp or the like, provided on the ceiling of the section 1 and capable of light control, and emits light in accordance with control of the computer 21a. If the illumination device B1 is turned on with brightness of 100%, the illuminance at the center position of the section 1 is 700 lux, for example, and the illuminance at a position far from the center of the section 1 (a position close to the boundary between the section 1 and the sections 2 and 4, for example) is smaller than 700 lux, for example. The illumination devices B2 to B15 are provided on the ceilings of the sections 2 to 15, respectively, similarly to the illumination B1.

As described above, in an embodiment of the present invention, on a ceiling of a section n (n is a natural number from 1 to 15), an air conditioner An and an illumination device Bn are provided.

==Details of Computer 21a==

Figure 4:
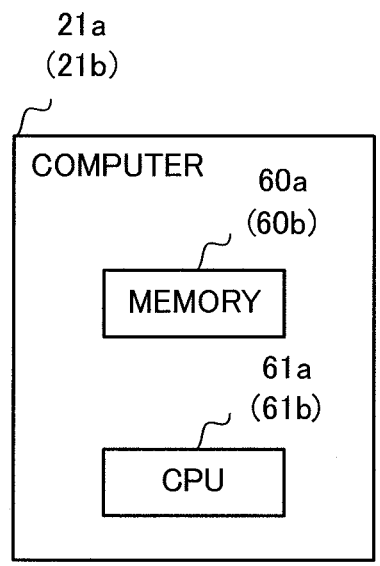
FIG. 4 is a diagram illustrating a configuration of a computer 21.

The computer 21a includes, as shown in FIG. 4, a memory 60a and a CPU 61a.

The memory 60a (storage unit) stores program data to be executed by the CPU 61a, for example. Also, the memory 60a stores illumination data (information) for setting of the brightness of the illumination device so that the illuminance of the entire section where a person is detected becomes 700 lux (predetermined illuminance), which is the illuminance with which a worker can perform a work comfortably, for example.

The brightness of each illumination device when the illuminance of a detected section is 700 lux, can be acquired from a calculation result of illuminance calculation by the point-by-point method or the lumen method, for example. In an embodiment of the present invention, when the illumination device in the detected section is turned on with the brightness of 100% and the illumination device in an adjacent section adjacent to the detected section is turned on with brightness of 60%, the illuminance in the entire detected section is 700 lux, for example. Thus, the above-described illumination data is data for turning on the illumination device in the detected section with brightness of 100%, for turning on the illumination device in the adjacent section with brightness of 60% and for turning off the illumination devices of the other sections.

Here, the illumination data is acquired without consideration of light other than that of the illumination device incident on the detected section (light from the outside, for example).

Figure 5:
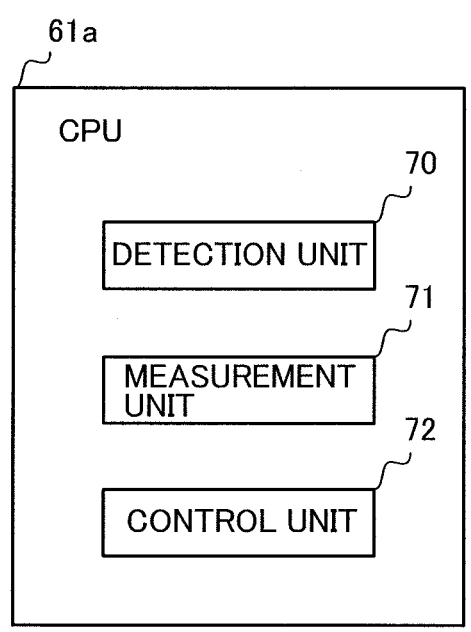

The CPU 61a realizes various functions by executing the program data stored in the memory 60a. Specifically, the CPU 61a realizes the functions of a detection unit 70, a measurement unit 71, and a control unit 72, as shown in FIG. 5.

The detection unit 70 detects presence or absence of a person in the office 15 on the basis of images outputted from the cameras 30 and 31. Further, if a person is detected, the detection unit 70 determines the detected section where a person is detected.

The measurement unit 71 measures illuminance of each section on the basis of the images outputted from the cameras 30 and 31.

The control unit 72 controls the air conditioners A1 to A15 and the illumination devices B1 to B15 on the basis of the operation result of the controller 20, the detection result of the detection unit 70, and the measurement result of the measurement unit 71. If the operation result of the controller 20 is outputted, the control unit 72 controls devices such as the illumination devices B1 to B15 and the like in accordance with the operation result. On the other hand, if the operation result is not outputted from the controller 20, the control unit 72 controls the illumination devices B1 to B15 and the like on the basis of the detection result of the detection unit 70 and the measurement result of the measurement unit 71.

Specifically, if the detection unit 70 detects a person, the control unit 72 controls the brightness of the illumination device on the basis of the illumination data so that the illuminance of the detected section is 700 lux. As described above, the light from the outside or the like incident on the detected section is not taken into consideration in acquiring the illumination data. Thus, if a great amount of light from the outside enters the detected section through the window, for example, after the brightness of the illumination device has been controlled, the illuminance of the detected section might become higher than 700 lux. If the illuminance of the detected section is higher than 710 lux, for example, the control unit 72 lowers the brightness of the illumination device so that the illuminance of the detected section becomes a desired illuminance of 700 lux with power consumption of the illumination device being reduced.

==Example of Processing to be Executed by Computer 21a==

Figure 6:
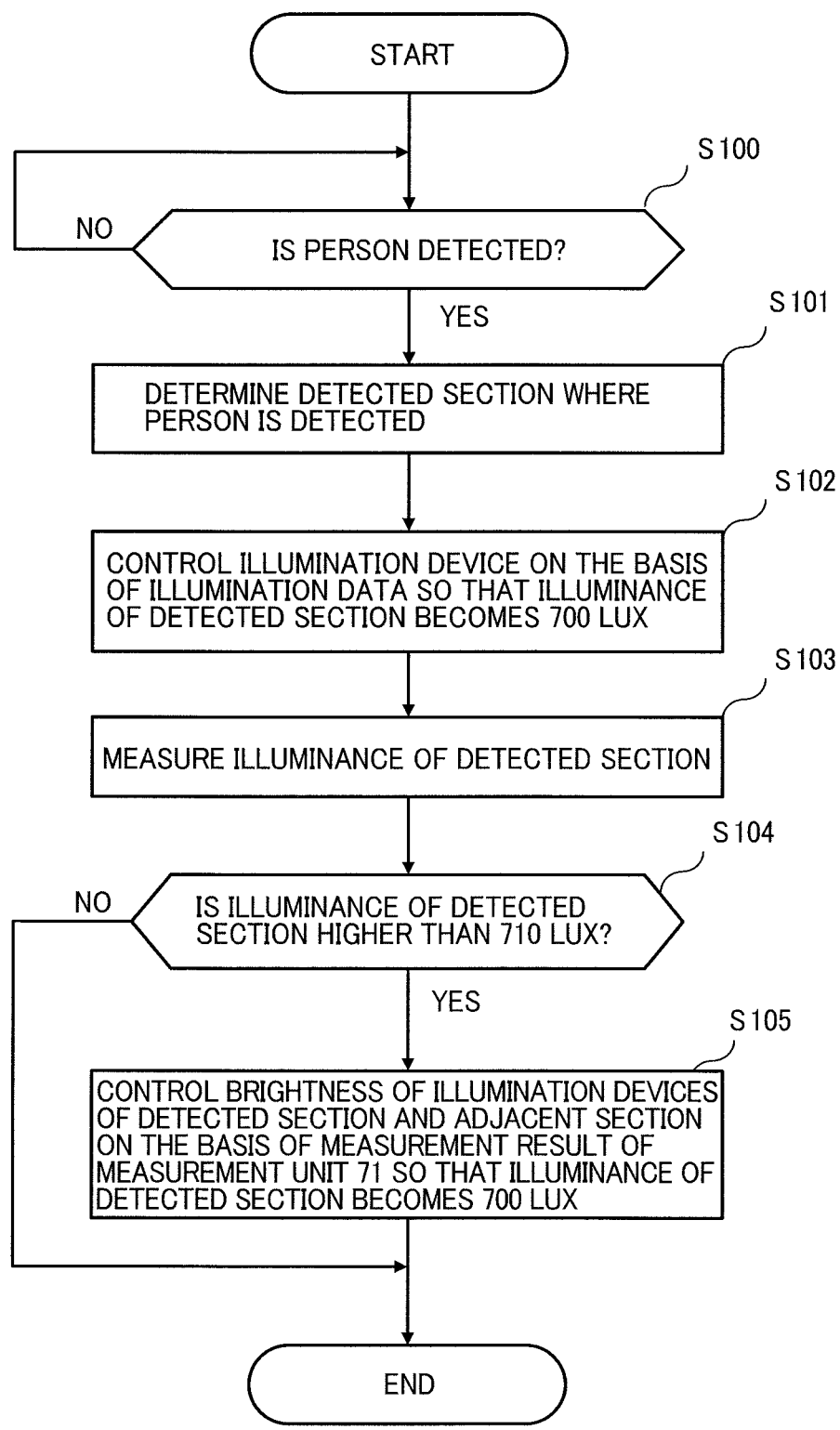

Here, a description will be given of an example of processing to be executed by the computer 21a in a case where the controller 20 is not operated, with reference to FIG. 6.

First, the detection unit 70 detects presence or absence of a person in the office 15 (S100). Then, if a person is detected (S100: YES), the detection unit 70 determines a detected section (S101). On the other hand, if a person is not detected (S100: NO), the detection unit 70 executes the processing S100. Then, if the detection unit 70 detects a person, the control unit 72 controls the brightness of the illumination device on the basis of illumination data so that the illuminance of the detected section becomes 700 lux (S102). Specifically, the control unit 72 turns on the illumination device in the detected section with the brightness of 100%, turns on the illumination device of the adjacent section with the brightness of 60%, and turns off the illumination device in the section other than the detected section and the adjacent section.

Thereafter, the measurement unit 71 measures illuminance of the detected section (S103), and the control unit 72 determines whether the illuminance of the detected section is higher than 710 lux or not (S104) on the basis of the measurement result of the measurement unit 71. If the illuminance of the detected section is higher than 710 lux (S104: YES), the brightness of the illumination device of the detected section or the adjacent section is lowered (S105) so that the illuminance of the detected section becomes the desired illuminance of 700 lux. If the illuminance of the detected section becomes 700 lux, the computer 21a finishes brightness control of the illumination device. On the other hand, if the illuminance of the detected section is lower than 710 lux (S104: NO), the computer 21a finishes the brightness control of the illumination device.

As described above, in an embodiment of the present invention, the brightness of the illumination device is controlled so that the illuminance of the detected section becomes 700 lux. As a result, the illuminance of the detected section becomes 700 to 710 lux.

==Operation of Device Control System 10a==

Figure 7:
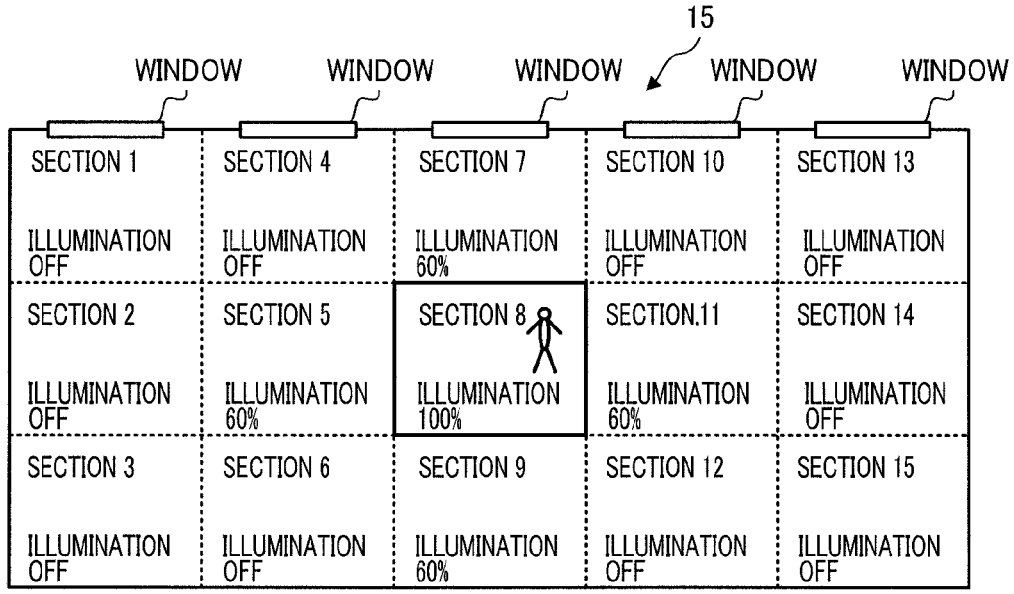
FIG. 7 is a diagram illustrating an example of brightness of illumination devices when a person is present in a section 8.

Here, with reference to FIG. 7, an operation of the device control system 10a in a case where a person is present in the section 8 of the office 15 will be described. Here, it is assumed that the controller 20 is operated in advance and all the illumination devices are off. Further, it is assumed that the inside of the office 15 has an illuminance of approximately several hundred lux by virtue of light through the window.

First, on the basis of the images from the cameras 30 and 31, the detection unit 70 executes the processing 5100 and detects that a person is present in the office 15. Then, the detection unit 70 executes the processing 101, so as to determine that the detected section is the section 8. Thus, here, the sections 5, 7, 9, and 11 are adjacent sections. The control unit 72 executes the processing S102, turns on the illumination device B8 of the section 8 with the brightness of 100%, and turns off the illumination devices B1 to B4, B6, B10, and B12 to B15 of the sections 1 to 4, 6, 10, and 12 to 15 on the basis of the illumination data stored in the memory 60a. Further, the control unit 72 executes control such that the illumination devices B5, B7, B9, and B11 of the sections 5, 7, 9, and 11 become the brightness of 60%. Thereafter, the measurement unit 71 measures the illuminance of the section 8. As described above, the inside of the office 15 has an illuminance of approximately several hundred lux, even if the illumination devices B1 to B15 are off. Thus, if the illumination devices of the section 8 and the adjacent sections are turned on, the illuminance of the section 8 becomes higher than 710 lux. Therefore, the control unit 72 gradually lowers the brightness of the illumination device of the adjacent sections, for example, so that the illuminance of the section 8 becomes 700 lux. At this time, in the illumination devices B5, B7, B9, and B11 of the adjacent sections, for example, the illumination devices in the adjacent sections with higher illuminance are sequentially selected. That is, in an embodiment of the present invention, first, the brightness of the illumination device B7 of the section 7, which is a section close to the window, is gradually lowered. Such processing is executed, so that the illuminance of the section 8 becomes 700 lux in the end.

Hereinabove, a description has been given of the case where a person is present in the section 8, but the same applies to the case where a person is present in the section 1, for example (not shown). In this case, the illumination device B1 in the section 1 is turned on with the brightness of 100%, and the illumination devices B3 and B5 to B15 of the sections 3 and 5 to 15 are turned off. Further, the illumination devices B2 and B4 of the sections 2 and 4 are controlled at the brightness of 60%.

Figure 8:
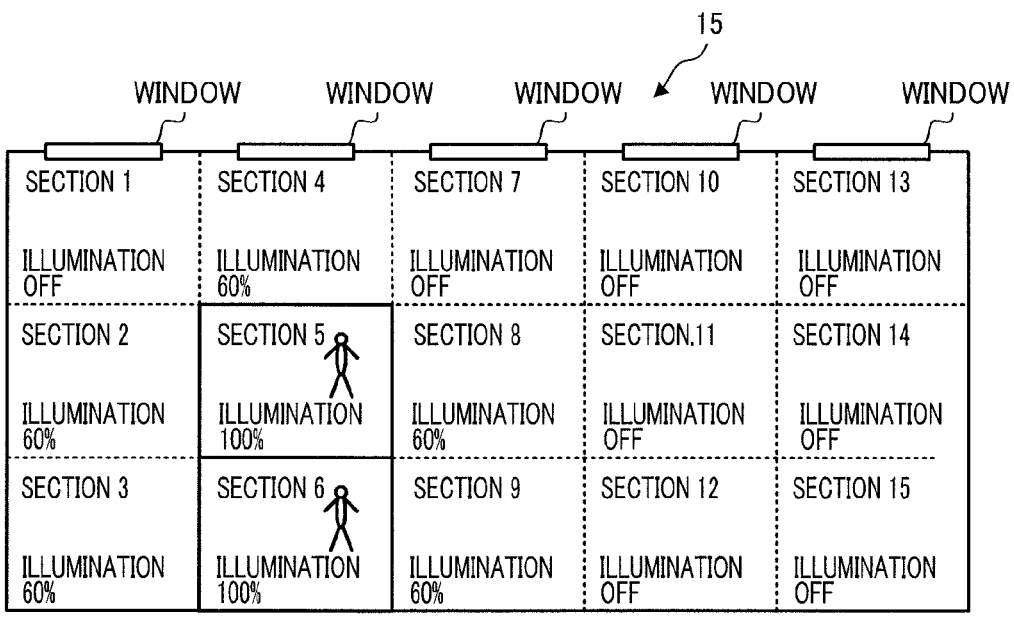
FIG. 8 is a diagram illustrating an example of brightness of illumination devices when persons are detected in sections 5 and 6.

Also, for example, a case where people are present in the plurality of sections 5 and 6, as shown in FIG. 8, is the same as the above-described case. In this case, the sections 5 and 6 are considered as the detected sections, and the sections 2, 3, 4, 8, and 9 are considered as the adjacent sections. Although the section 5 is considered as the adjacent section in the relationship with the section 6, the detection unit 70 determines a detected section where a person is detected, as described above. Thus, in the case of FIG. 8, the illumination devices B5 and B6 of the sections 5 and 6 are turned on with the brightness of 100%, and the illumination devices B1, B7, and B10 to B15 of the sections 1, 7, and 10 to 15 are turned off. Further, the illumination devices B2, B3, B4, B8, and B9 of the sections 2, 3, 4, 8, and 9 are controlled at the brightness of 60%.

==Second Embodiment of Device Control System 10==

Here, a description will be given of a device control system 10b, which is a second embodiment of the device control system 10. If the device control system 10b is compared with the device control system 10a, they are similar with an exception that a computer 21b is provided instead of the computer 21a as shown in FIG. 1. In the device control system 10b, numeral references of blocks different from those in the device control system 10a are put in parentheses. Here, the computer 21b will be described.

The computer 21b (illumination control apparatus) is a device configured to integrally control the device control system 10b. The computer 21b includes a memory 60b and a CPU 61b as shown in FIG. 4.

Figure 9:
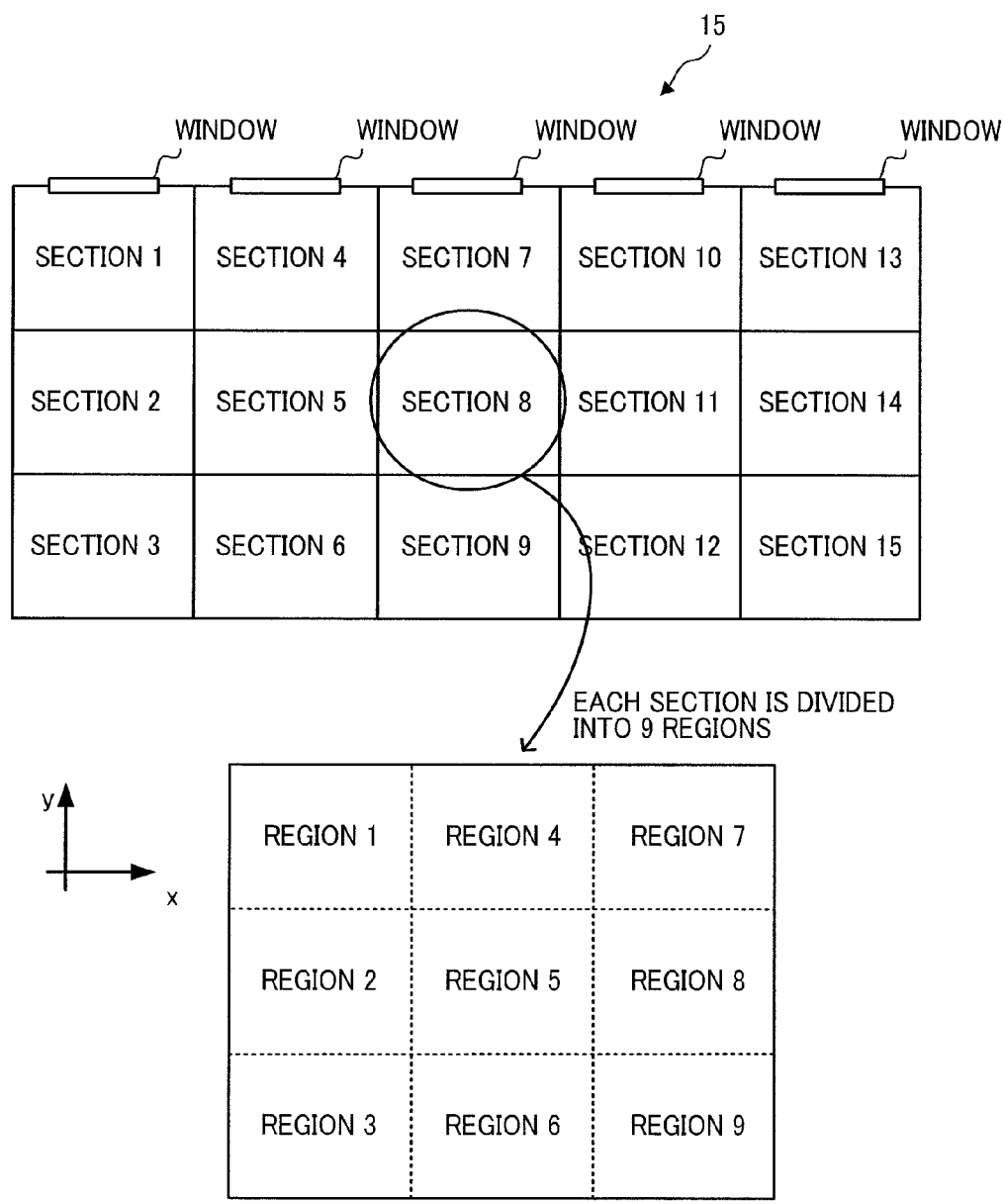
FIG. 9 is a diagram illustrating a plurality of regions included in a section.

The memory 60b (storage unit) stores program data to be executed by the CPU 61b, for example. Also, the memory 60b stores setting data (information) for setting the brightness of the illumination device so that the illuminance of a detected region where a person is detected becomes 700 lux. Here, the detected region is a region where a person is detected, among regions obtained by dividing one section into 9 regions as shown in FIG. 9, for example. In FIG. 9, only the regions included in the section 8 are illustrated, however, in an embodiment of the present invention, it is assumed that each of the sections 1 to 15 includes 9 regions.

The brightness of each illumination device when the illuminance of the detected region is 700 lux, can be acquired from the calculation result of the illuminance calculation by the point-by-point method or the lumen method, for example. In order to achieve an illuminance of 700 lux in the detected region, it is necessary to satisfy the following conditions while the illumination device in the detected section is turned on with the brightness of 100%.

If the detected region is the region 1, for example, when the illumination device of the adjacent section, which is adjacent to the detected section in the +y direction, and the illumination device in the adjacent section, which is adjacent to the detected section in the −x direction, are turned on with the brightness of 60%, the illuminance of the region 1 becomes 700 lux. Hereinafter, it is assumed that the condition for the illuminance of the region 1 to be set at 700 lux is a condition 1.

In a case where the detected region is the region 2, for example, when the illumination device of the adjacent section, which is adjacent to the detected section in the −x direction, is turned on with the brightness of 60%, the illuminance of the region 2 becomes 700 lux (condition 2).

In a case where the detected region is the region 3, for example, when the illumination device of the adjacent section, which is adjacent to the detected section in the −y direction, and the illumination device of the adjacent section, which is adjacent to the detected section in the −x direction, are turned on with the brightness of 60%, the illuminance of the region 3 becomes 700 lux (condition 3).

In a case where the detected region is the region 4, for example, when the illumination device of the adjacent section, which is adjacent to the detected section in the +y direction, is turned on with the brightness of 60%, the illuminance of the region 4 becomes 700 lux (condition 4).

In a case where the detected region is the region 5, since the region 5 is located at the center of the detected section, the illuminance of the region 5 becomes 700 lux by turning on the illumination device of the detected section with the brightness of 100% (condition 5). That is, in this case, the illumination device in the adjacent sections may be turned off.

In a case where the detected region is the region 6, for example, when the illumination device of the adjacent section, which is adjacent to the detected section in the −y direction, is turned on with the brightness of 60%, the illuminance of the region 6 becomes 700 lux (condition 6).

In a case where the detected region is the region 7, for example, when the illumination device of the adjacent section, which is adjacent to the detected section in the +y direction, and the illumination device of the adjacent section, which is adjacent to the detected section in the +x direction, are turned on with the brightness of 60%, the illuminance of the region 7 becomes 700 lux (condition 7).

In a case where the detected region is the region 8, for example, when the illumination device of the adjacent section, which is adjacent to the detected section in the +x direction, is turned on with the brightness of 60%, the illuminance of the region 8 becomes 700 lux (condition 8).

In a case where the detected region is the region 9, for example, when the illumination device of the adjacent section, which is adjacent to the detected section in the −y direction, and the illumination device of the adjacent section, which is adjacent to the detected section in the +x direction, are turned on with the brightness of 60%, the illuminance of the region 9 becomes 700 lux (condition 9).

Thus, the above-described setting data is such data as to execute control so that the illumination device in the detected section and the illumination device in the adjacent sections satisfy each of the conditions (conditions 1 to 9) and to turn off the illumination devices in the other sections. Here, the setting data is acquired without consideration of the light other than that from the illumination device incident on the detected section.

Figure 10:
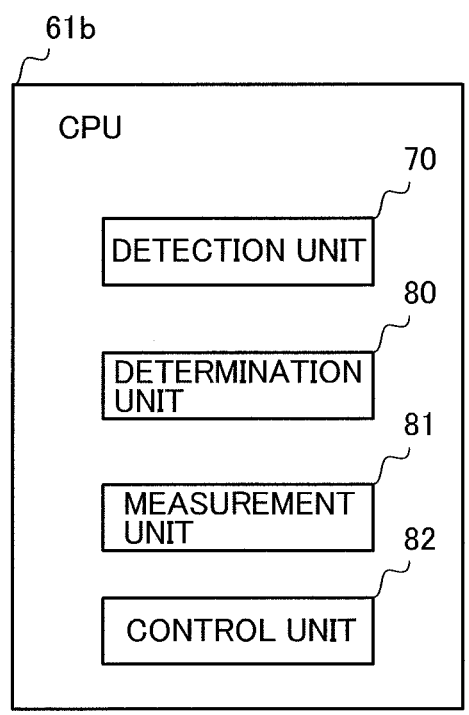
FIG. 10 is a diagram illustrating a functional block implemented by a CPU 61b.

The CPU 61b realizes various functions by executing the program data stored in the memory 60b. Specifically, the CPU 61b realizes the functions of the detection unit 70, a determination unit 81, the measurement unit 81, and the control unit 82 as shown in FIG. 10. The detection unit 70 is similar to the detection unit 70 implemented by the CPU 61a.

The determination unit 80 determines a detected region where a person is detected among the plurality of regions 1 to 9 in the detected section on the basis of the images outputted from the cameras 30 and 31.

The measurement unit 81 measures illuminance of each region on the basis of the images outputted from the cameras 30 and 31.

The control unit 82 is similar to the above-described control unit 72 with an exception that it controls illumination devices B1 to B15 so that the illuminance of the detected region becomes 700 lux. Specifically, if the determination unit 80 determines the detected region, the control unit 82 controls the brightness of the illumination device on the basis of the setting data so that the illuminance of the detected region becomes 700 lux. As described above, the setting data is acquired without consideration of the light incident on the detected region from the outside and the like. Thus, if the illuminance of the detected region is higher than 710 lux, for example, the control unit 82 lowers the brightness of the illumination devices in the detected section and the adjacent sections so that the illuminance of the detected region becomes the desired illuminance of 700 lux, similarly to the control unit 72.

==Example of Processing to be Executed by Computer 21b==

Figure 11:
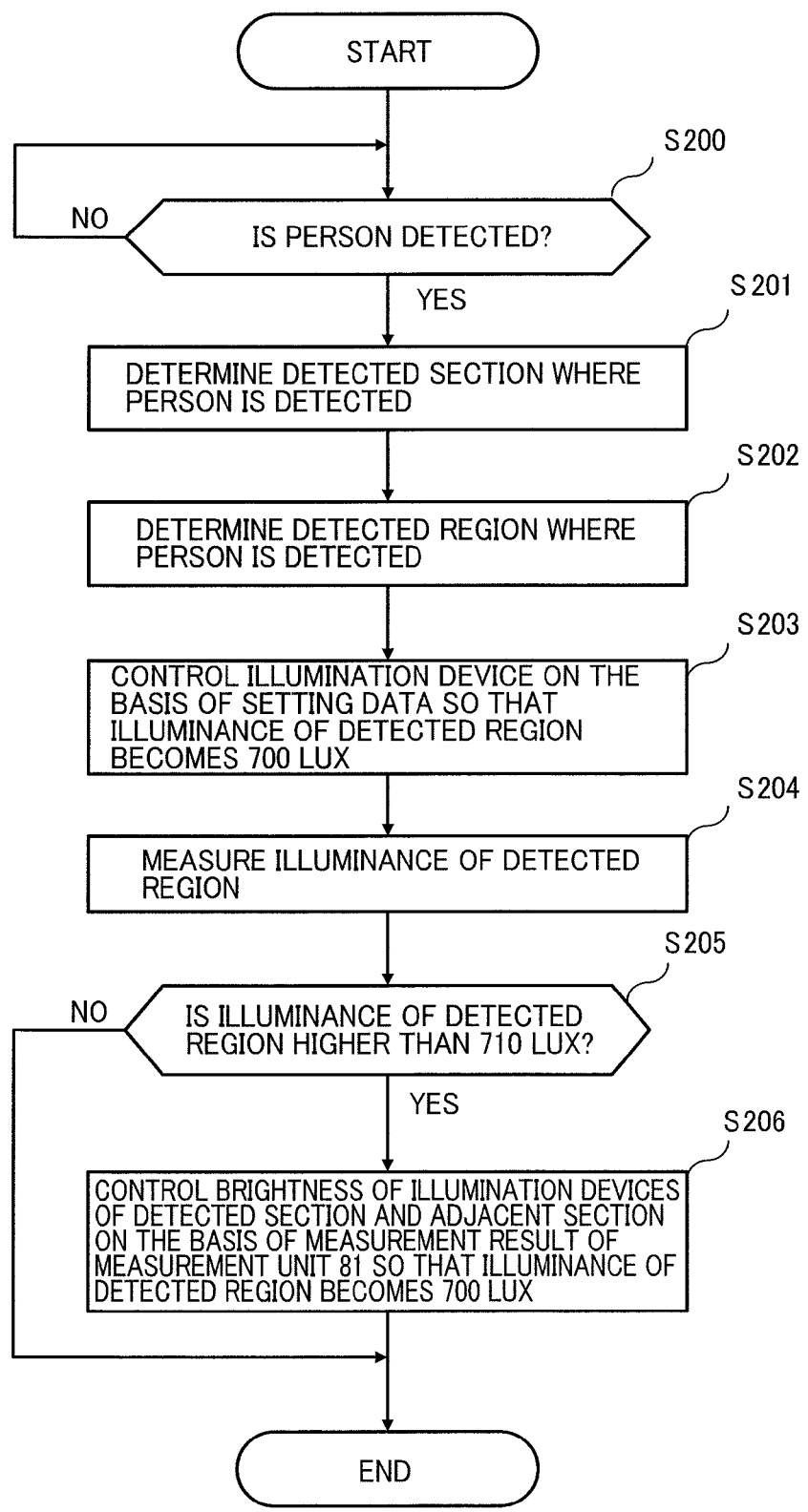
FIG. 11 is a flowchart illustrating an example of processing to be executed by a computer 21b.

Here, a description will be given of an example of the processing to be executed by the computer 21b in a case where the controller 20 is not operated, with reference to FIG. 11.

First, the detection unit 70 detects presence or absence of a person in the office 15 (S200). Then, if a person is detected (S200: YES), the detection unit 70 determines a detected section (S201). On the other hand, if a person is not detected (S200: NO), the detection unit 70 executes the processing 5200. Then, the determination unit 80 further determines a region where a person is detected in the detected section (S202). If the determination unit 80 determines a detected region, the control unit 82 controls the brightness of the illumination device on the basis of setting data so that the illuminance of the detected region becomes 700 lux (S203).

Thereafter, the measurement unit 81 measures the illuminance of the detected region (S204), and the control unit 82 determines whether the illuminance of the detected region is higher than 710 lux or not on the basis of the measurement result of the measurement unit 81 (S205). If the illuminance of the detected region is higher than 710 lux (S205:YES), the brightness of the illumination devices in the detected section and the adjacent section is controlled so that the illuminance of the detected region becomes the desired illuminance of 700 lux (S206). Then, if the illuminance of the detected region becomes 700 lux, the computer 21b finishes control of the brightness of the illumination device. On the other hand, if the illuminance of the detected region is lower than 710 lux (S205: NO), the computer 21a finishes the control of the brightness of the illumination device.

As described above, in an embodiment of the present invention, the brightness of the illumination device is controlled so that the illuminance of the detected region becomes 700 lux, and the illuminance of the detected region results in 700 to 710 lux.

==Operation of Device Control System 10b==

Figure 12:
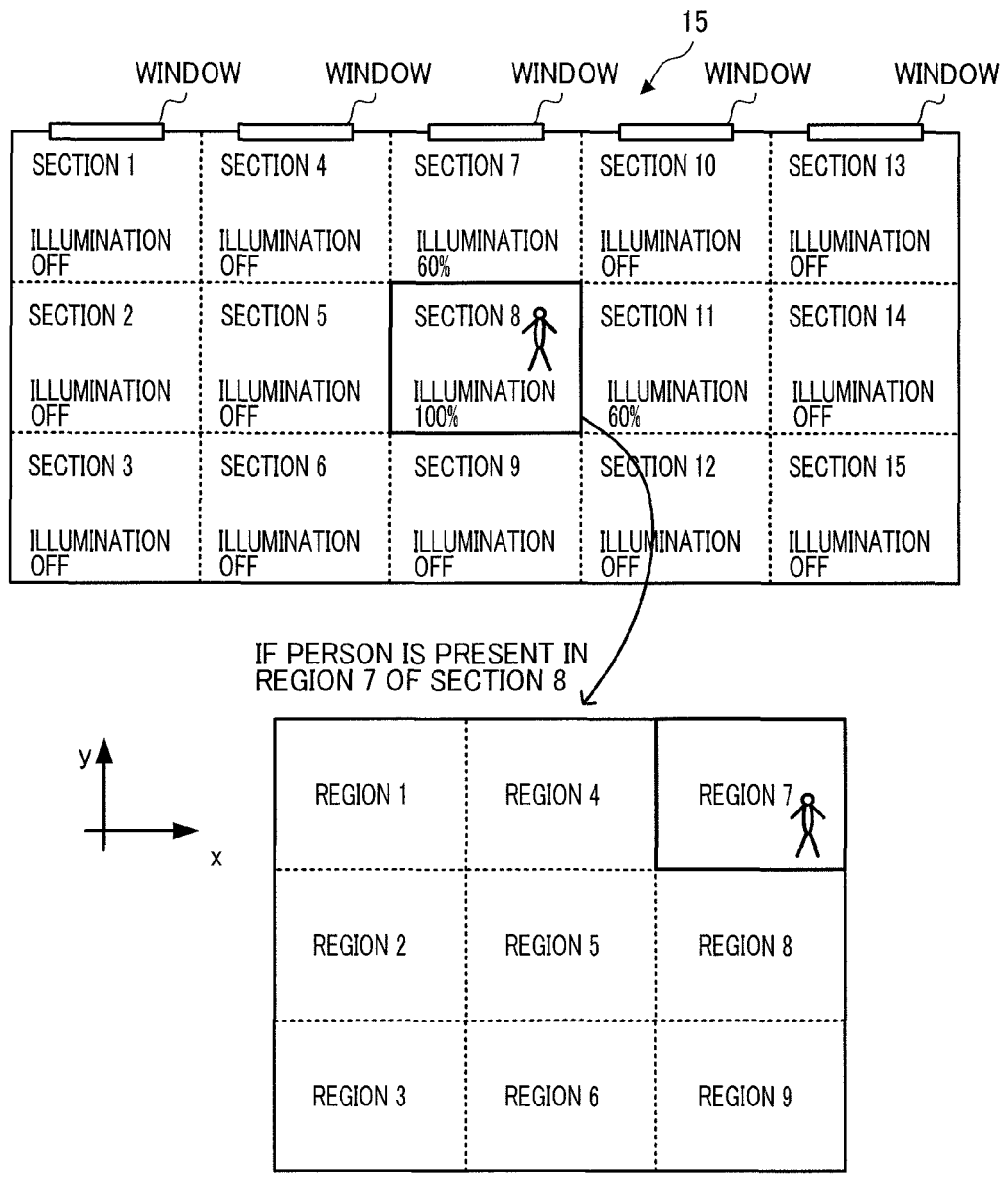
FIG. 12 is a diagram illustrating an example of brightness of illumination devices when a person is present in a region 7 in a section 8.

Here, with reference to FIG. 12, a description has been given of an operation of the device control system 10b if a person is present in the region 7 of the section 8, for example. It is assumed here that the controller 20 has been operated in advance, and all the illumination devices have been turned off. Further, it is assumed that even if all the illumination devices are turned off, the inside of the office 15 has an illuminance of approximately several hundred lux by virtue of the light through the window.

First, the detection unit 70 executes the processing 5200 and detects that a person is present in the office 15 on the basis of the images from the cameras 30 and 31. Then, the detection unit 70 executes the processing 201 and determines that the detected section is the section 8. Further, the determination unit 80 executes the processing 5202 and determines that a person is present in the region 7 in the section 8, which is the detected section. Thus, here, the setting data, which satisfies the condition 7, is read. The control unit 82 executes the processing S203 and turns on the illumination device B8 of the section 8 with the brightness of 100%, while it turns off the illumination devices B1 to B6, B9, B10, and B12 to B15 of the sections 1 to 6, 9, 10, and 12 to 15 on the basis of the setting data of the condition 7 stored in the memory 60b.

Furthermore, the control unit 82 controls the illumination devices B7 and B11 of the sections 7 and 11 with the brightness of 60%.

Thereafter, the measurement unit 81 measures the illuminance of the region 7. As described above, the inside of the office 15 has an illuminance of approximately several hundred lux even if the illumination devices B1 to B15 are turned off. Thus, when the illumination devices in the section 8 and the sections 7 and 11 are turned on, the illuminance of the region 7 becomes higher than 710 lux. Therefore, the control unit 82 gradually lowers the brightness of the illumination devices of the sections 7 and 11, for example, so that the illuminance of the region 7 becomes 700 lux.

At this time, in the illumination devices B7 and B11 of the sections 7 and 11, for example, the illumination devices in the adjacent sections with higher illuminance are sequentially selected and the brightness thereof is gradually lowered. That is, in an embodiment of the present invention, first, the brightness of the illumination device B7 of the section 7, which is a section close to the window, is gradually lowered. Such processing is executed, so that the illuminance of the region 7 becomes 700 lux in the end.

Hereinabove, a description has been given of the device control system 10 according to an embodiment of the present invention. For example, in the device control system 10a, the illumination device of the detected section is turned on with the brightness of 100%, and the illumination devices of the adjacent sections are turned on with the brightness of 60%, so that the illuminance of the detected section becomes 700 lux. Further, the illumination devices in the sections other than the detected section and the adjacent sections are turned off. Thus, as compared with the case where the illumination devices in the detected section and the adjacent section are both turned on with the brightness of 100%, the power consumption can be reduced with the desired illuminance being ensured.

The brightness of the illumination device of the adjacent section can be acquired on the basis of the calculation result of the illuminance calculation by the point-to-point method or the lumen method, for example, in a state where the illumination device of the detected section is on with the brightness of 100%, and the illumination devices in the sections other than the detected section and the adjacent sections are off. At this time, the light other than the illumination device incident on the detected section (light from the outside, for example) is not taken into consideration. Thus, by controlling the illumination device on the basis of the illumination data obtained by calculation, the illuminance of the detected section can reliably be set at an illuminance more than or equal to the desired illuminance, regardless of the presence or absence of the light from the outside.

The illumination data is stored in the memory 60a. Thus, as compared with a case where the detection unit 70 of the CPU 61a sequentially calculates the above-described illumination data each time a person is detected, for example, a load on the CPU 61a can be reduced.

The determination unit 80 determines the detected region where a person is detected among the plurality of regions in the detected section on the basis of the outputs from the video cameras 30 and 31. Then, the control unit 82 controls the brightness of the illumination of the adjacent section so that the illuminance of the detected region becomes the desired illuminance. For example, as shown in FIG. 12, if the region 7 of the section 8 is a detected region, the control unit 82 turns off the illumination devices B5 and B9 of the sections 5 and 9 among the adjacent sections 5, 7, 9, and 11, and sets the illumination devices B7 and B11 of the sections 7 and 11 at the brightness of 60%. On the other hand, if the illumination device is controlled on the basis of only the detected section as shown in FIG. 7, all the illumination devices B5, B7, B9, and B11 of the adjacent sections 5, 7, 9, and 11 are turned on with the brightness of 60%. That is, the brightness of the illumination device is controlled on the basis of the information of the detected region, in addition to the detected section, so that the power consumption can be more reduced while with the region where a person is present is kept at the desired illuminance. The section can be divided into the plurality of regions using a human detection sensor or the like. However, in such a case, the human detection sensors need to be provided in the same number as that of the regions. In an embodiment of the present invention, the determination unit 80 determines the detected region on the basis of the outputs of the video cameras 30 and 31. Thus, even if the number of regions is increased, the sensors or the like do not have to be newly increased.

The measurement unit 71 measures the illuminance of the detected section on the basis of the outputs from the video cameras 30 and 31. As described above, if a window is provided in the office 15, even if the illumination devices in the office 15 are turned off, the inside of the office 15 might be bright. The control unit 72 controls the brightness of the illumination device of the adjacent section, for example, on the basis of the measurement result of the measurement unit 71, so that the illuminance of the detected section becomes the desired illuminance. As a result, in an embodiment of the present invention, as compared with a case where the brightness of the illumination device is controlled on the basis of the illuminance calculation result, the power consumption can be reduced while the illuminance of the detected section is kept at the desired illuminance.

The measurement unit 81 measures the illuminance of the detected region on the basis of the outputs from the video cameras 30 and 31. Then, the control unit 82 controls the brightness of the illumination device of the adjacent section, for example, on the basis of the measurement result of the measurement unit 81 so that the illuminance of the detected region becomes the desired illuminance. As a result, as compared with a case where the brightness of the illumination device is controlled on the basis of the illuminance of the detected section, only the region where a person is present is set at the desired illuminance, and thus, the power consumption can be further reduced.

The above embodiments of the present invention are simply for facilitating the understanding of the present invention and are not in any way to be construed as limiting the present invention. The present invention may variously be changed or altered without departing from its spirit and encompass equivalents thereof.

For example, in the processing 5105, the brightness of the illumination device of the detected section may be lowered in the first place. That is, in the processing S105, it is only necessary that at least either one of the illumination devices of the detected section and the adjacent section is controlled so as to cause the illuminance of the detected section to be set at the predetermined illuminance.

For example, the control unit 72 may control the temperatures of the air conditioners A1 to A16 on the basis of the measurement result of the measurement unit 71. For example, if the illuminance in the office 15 is higher than 710 lux, this proves that a great amount of light comes into the office 15 from the outside. In such a case, the temperature in the office 15 is generally raised by the outside light. Thus, if the illuminance of the section 1 beside the window is higher than 710 lux, for example, the control unit 72 may lower the temperature of the air conditioner A1 than the set temperature. With such a configuration, the power consumption of the air conditioner A1 can be reduced.

What is claimed is:

1. An illumination control apparatus configured to control brightness of a plurality of illumination devices provided in a plurality of sections, respectively, comprising:
   a detection unit configured to detect presence or absence of a person in each of the plurality of sections based on an output of a video camera configured to take images of the plurality of sections; and
   a control unit configured to:
      turn on an illumination device of a detected section among the plurality of illumination devices, the detected section being a section where a person is detected,
      turn off an illumination device of a section other than the detected section and an adjacent section among the plurality of illumination devices, the adjacent section being a section adjacent to the detected section, and
      control brightness of the illumination device of the adjacent section so that illuminance of the detected section becomes predetermined illuminance, wherein
   in a state where the illumination device of the detected section is on and the illumination device of a section other than the detected section and the adjacent section is off, the control unit controls the brightness of the illumination device of the adjacent section based on information indicating brightness of the illumination device of the adjacent section calculated so that the illuminance of the detected section becomes the predetermined illuminance.

2. The illumination control apparatus according to claim 1, further comprising a storage unit configured to store information indicating the brightness of the illumination device of the adjacent section, wherein
   the control unit controls the brightness of the illumination device of the adjacent section based on the information, indicating the brightness of the illumination device of the adjacent section, stored in the storage unit.

3. The illumination control apparatus according to claim 1, further comprising a determination unit configured to determine a detected region among a plurality of regions in the detected section based on an output of the video camera, the detected region being a region where a person is detected, wherein
   in a state where the illumination device of the detected section is on and the illumination device of a section other than the detected section and the adjacent section is off, the control unit controls the brightness of the illumination device of the adjacent section based on information indicating brightness of the illumination device of the adjacent section calculated so that illuminance of the detected region becomes predetermined illuminance.

4. The illumination control apparatus according to claim 1, further comprising a measurement unit configured to measure the illuminance of the detected section based on an output of the video camera, wherein
   the control unit controls brightness of at least either one of the illumination device of the detected section and the illumination device of the adjacent section, based on a measurement result of the measurement unit, so that the illuminance of the detected section becomes the predetermined illuminance.

5. The illumination control apparatus according to claim 4, further comprising a determination unit configured to determine a detected region among a plurality of regions in the detected section based on an output from the video camera, the detected region being a region where a person is detected, wherein
   the control unit controls the brightness of at least either one of the illumination device of the detected section and the illumination device of the adjacent section, based on a measurement result of the measurement unit, so that the illuminance of the detected region becomes the predetermined illuminance.

* * * * *